Patented Dec. 16, 1952

2,622,175

UNITED STATES PATENT OFFICE 2,622,175

TRISAZO-DYESTUFFS

Karl Menzi, Basel, Switzerland, assignor to Ciba Limited, Basel, Switzerland, a Swiss firm No Drawing. Application April 30, 1951, Serial No. 223,823. In Switzerland May 16, 1950

10 Claims. (Cl. 260—172)

According to this invention valuable new trisazo dyestuffs are made by coupling an aromatic metadihydroxy-compound capable of coupling twice and containing at most two fused 6-membered rings, on the one hand with a diazo compound of an amine of the formula

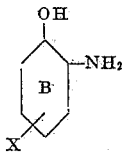

in which the substituent X is in para-position relatively to one of the other two substituents and represents a —CO-alkyl or advantageously a carboxylic acid arylide radical bound to the benzene nucleus B by the —CO-group, and, on the other, with a diazo-azo-compound obtainable by coupling tetrazotized 4:4′-diaminodiphenyl on one side with a 1-hydroxybenzene-2-carboxylic acid.

The aromatic meta-dihydroxy-compound capable of coupling twice contains at most two fused 6-membered rings. It may therefore belong to the naphthalene series, but is advantageously of the benzene series. As examples there may be mentioned 1:3-dihydroxynaphthalene and especially 1:3-dihydroxybenzene.

The amines of the above formula contain in para-position relatively to the amino group or preferably in para-position to the hydroxyl group the substituent X, which represents a —CO-alkyl or —CO-aryl radical, but advantageously a carboxylic acid arylide radical bound to the benzene nucleus containing the amino and hydroxyl groups by the —CO-group. The aryl radical present in the carboxylic acid amide group may belong to the naphthalene series or more especially the benzene series. It may contain substituents, for example a halogen atom such as chlorine, a lower alkyl or alkoxy group such as a methyl, ethyl, methoxy or ethoxy group. The alkyl group present in the —CO-alkyl radical or in any

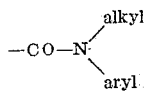

radical likewise preferably contains only a few carbon atoms such, for example, as an ethyl or methyl group.

As examples of amines corresponding to the above formula and suitable as starting materials in the above process there may be mentioned:

3-amino-4-hydroxy-1-acetophenone,
(3-amino-4-hydroxy-phenyl)-n-propyl-ketone,
(3-amino-4-hydroxy-phenyl)-ethyl-ketone,
1 - hydroxy - 2 - aminobenzene-5-carboxylic acid phenylamide,
1 - hydroxy - 2 - aminobenzene - 4 - carboxylic acid-(2′-chloro)-phenylamide,
1 - hydroxy - 2 - aminobenzene - 4 - carboxylic acid-(3′-chloro)-phenylamide,
1 - hydroxy - 2 - aminobenzene - 4 - carboxylic acid-(4′-methyl)-phenylamide,
1 - hydroxy - 2 - aminobenzene - 4 - carboxylic acid-(2′-methoxy)-phenylamide,
1 - hydroxy - 2 - aminobenzene - 4 - carboxylic acid-(4′-ethoxy)-phenylamide,
1 - hydroxy - 2 - aminobenzene - 4 - carboxylic acid-naphthyl-(1)-amide,
1 - hydroxy - 2 - aminobenzene - 4 - carboxylic acid-cyclohexylamide,
1 - hydroxy - 2 - aminobenzene - 4 - carboxylic acid-N-methyl-phenylamide, Especially advantageous is 1 - hydroxy - 2-amino-benzene-4-carboxylic acid phenylamide.

A large number of such amines are known, and those which are not known can be made by methods in themselves known (compare, for example, U. S. Patents No. 2,467,621 and 2,538,568).

The diazo compounds also used as starting materials in the present process are obtained by coupling tetrazotized 4:4′-diaminodiphenyl on one side with a 1-hydroxybenzene-2-carboxylic acid. As 1-hydroxybenzene-2-carboxylic acids there come into consideration, for example, 5- or 6-methyl-1-hydroxybenzene-2-carboxylic acid and above all 1-hydroxybenzene-2-carboxylic acid containing no further substituents. The coupling of the tetrazotized 4:4′-diaminodiphenyl compounds with the hydroxybenzene ortho-carboxylic acids is carried out in known manner advantageously in a weakly alkaline medium, for example a medium rendered alkaline with an alkali carbonate, and with the use of approximately equimolecular proportions of the tetrazo compound of the azo component.

Especially valuable trisazo-dyestuffs are obtained by the present process when all the starting materials are free from sulfonic acid groups.

The coupling of the aromatic meta-dihydroxy-compound with the two different diazo compounds may be carried out in either order of succession. However, it is in general of advantage to carry out the coupling with the diazo-azo-compound in the second stage. Both couplings are advantageously carried out in an alkaline medium.

The dyestuffs obtainable by the present process are new. They correspond to the general formula

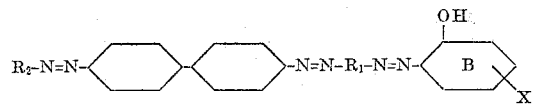

in which $R_1$ represents the radical of an aromatic meta-dihydroxy-compound to which the hydroxyl groups are bound in positions vicinal to the azo groups and which contains at most two fused 6-membered rings, R₂ represents the radical of a 1-hydroxybenzene-2-carboxylic acid bound in the 4-position to the azo group, and X represents a —CO-alkyl radical present in para-position relatively to one of the other two substituents, or a carboxylic acid arylide radical bound in para-position relatively to one of the two other substituents to the benzene nucleus B by the —CO-group.

The dyestuffs of the invention are suitable for dyeing a very wide variety of materials, for example, animal fibers such as wool, silk and leather, but especially for dyeing or printing cellulose materials such as cotton, linen, or artificial silk or staple fibers of regenerated cellulose. The dyestuffs may be treated on the fiber or partly on the fiber and partly in the dyebath with agents yielding metal by generally known methods. It is of advantage to use, for example, the process of U. S. Patent No. 2,148,659, in which first the dyeing and then the treatment with an agent yielding metal are carried out in the same bath. As agents yielding metal there come into consideration preferably those which are stable towards alkaline solutions, such as complex copper tartrates and the like.

In many cases especially valuable dyeings are obtained by working according to the process in which the dyeing or print produced with the metal-free dyestuff is after-treated with an aqueous solution containing a basic condensation product of formaldehyde with a compound which contains at least once the atomic grouping

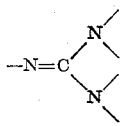

or a compound such, for example, as cyanamide which can be easily converted into such a compound, and which solution also contains a water-soluble, and especially a complex, copper compound. Such a process is described for example in British Patent No. 619,969.

The following examples illustrate the invention, the parts and percentages being by weight unless otherwise stated and the relationship of parts by weight to parts by volume being the same as that of the kilogram to the liter:

Example 1

18.4 parts of 4:4'-diaminodiphenyl are tetrazotized in the usual manner with 13.8 parts of sodium nitrite, and coupled with 14.0 parts of 1-hydroxybenzene-2-carboxylic acid in known manner in a medium rendered alkaline with sodium carbonate in order to form the diazo-azo-compound. To the suspension of the resulting intermediate product is added at 8–12° C., a solution obtained by dissolving in 800 parts of water with the addition of 16 parts by volume of sodium hydroxide solution of 30 per cent. strength the monoazo-dyestuff prepared as described below.

A suspension of 25.1 parts of 1-hydroxy-2-aminobenzene-4-carboxylic acid phenylamide in 80 parts of water is cooled to 0° C. by the addition of ice and mixed with 27.5 parts of hydrochloric acid of 30 per cent. strength and 8 parts of sodium chloride. At 0–5° C. a solution of 7.6 parts of sodium nitrite in 25 parts of water is introduced dropwise, and the diazotization mixture is then stirred for about 20 minutes at 5–12° C. The solid diazonium compound is separated by filtration, washed with water until the filtrate no longer has an acid reaction to Congo, and suspended in a solution of 14.4 parts of 1:3-dihydroxybenzene and 1 part of concentrated hydrochloric acid in 100 parts of water. For the purpose of coupling the resulting mixture is run at 5–10° C. into a solution of 40 parts of sodium carbonate in 300 parts of water. After stirring for 8 hours the monoazo-dyestuff is completely precipitated by the addition of sodium chloride and separated by filtration.

After stirring for 12 hours, the reaction solution is heated to 60° C. and the trisazo-dyestuff is completely precipitated by the addition of sodium chloride.

The new dyestuff which corresponds to the formula

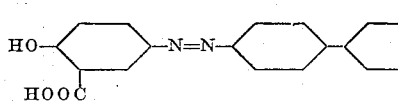
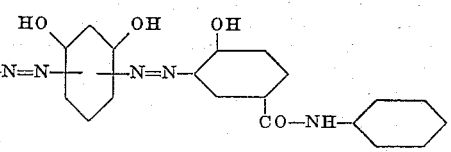

is a dark powder having a slightly green bronze lustre, which dissolves in water, dilute sodium carbonate solution and dilute sodium hydroxide solution with a brown coloration. It dyes cotton by the single or 2-bath after-coppering process brown tints of very good fastness to light and excellent wet fastness properties.

By using in this example, instead of 1-hydroxy-2-aminobenzene-4-carboxylic acid phenylamide, an equimolecular quantity of (1) 1 - hydroxy - 2 - aminobenzene-5-carboxylic acid phenylamide,
(2) 1 - hydroxy - 2 - aminobenzene-4-carboxylic acid-(2'-chloro)-phenylamide,
(3) 1 - hydroxy - 2 - aminobenzene-4-carboxylic acid-(3'-chloro)-phenylamide,
(4) 1 - hydroxy - 2 - aminobenzene-4-carboxylic acid-(4'-methyl)-phenylamide,
(5) 1 - hydroxy - 2 - aminobenzene-4-carboxylic acid-(2'-methoxy)-phenylamide,
(6) 1 - hydroxy - 2 - aminobenzene-4-carboxylic acid-cyclohexylamide,
(7) 1 - hydroxy - 2 - aminobenzene-4-carboxylic acid-naphthyl-1-amide,
(8) 1 - hydroxy - 2 - aminobenzene-4-carboxylic acid-N-methylphenylamide or
(9) 3 - amino - 4-hydroxy-1-acetophenone, there are obtained dyestuffs of which the dyeings are similar to that of the dyestuff described above both with regard to their tint and fastness properties.

These dyestuffs correspond to the formula

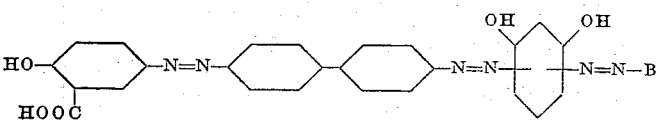

wherein B represents the radicals of the above diazo components, viz. the following radicals (listed in the order given above of diazo components):

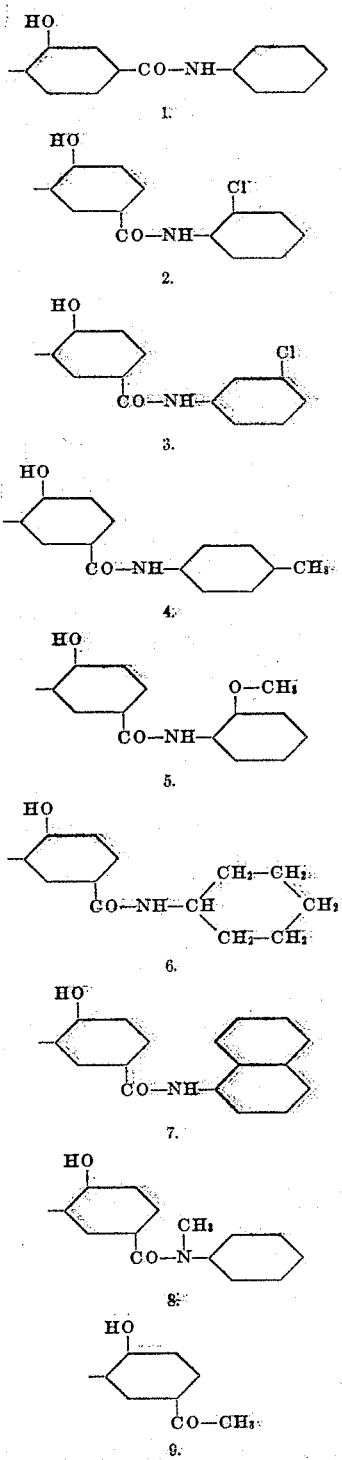

Similar dyeings are also obtained by using, instead of 1-hydroxybenzene-2-carboxylic acid, an equimolecular proportion of 5-methyl- or 6-methyl-1-hydroxybenzene-2-carboxylic acid.

By using in the above example, instead of 1:3-dihydroxybenzene, an equimolecular proportion of 1:3-dihydroxy-naphthalene, there is obtained a dark powder which dissolves in water and in dilute sodium carbonate solution with a brown coloration and in concentrated sulfuric acid with a violet coloration. This dyestuff dyes cotton by the single or 2-bath after-coppering process brown tints having an olive shade which have very good properties of wet fastness and good fastness to light.

Example 2

100 parts of cotton are entered at 50° C. into a dyebath consisting of 4000 parts of water, 2 parts of anhydrous sodium carbonate and 0.6 part of the dyestuff obtainable as described in the first four paragraphs of Example 1. The temperature is raised to 90–95° C. in the course of 20 minutes, 30 parts of crystalline sodium sulfate are added and dyeing is carried on for 30 minutes at 90–100° C. The whole is then allowed to cool to about 70° C., 1.3 parts of complex sodium copper tartrate of approximately neutral reaction are added, coppering is carried on for ½ hour at about 80° C., and then the dyeing is rinsed with cold water. If desired the dyeing may be soaped by after-treatment with a solution containing 5 parts of soap and 2 parts of anhydrous sodium carbonate in 1000 parts of water. A brown dyeing of very good fastness to light and washing is obtained.

What is claimed is:

1. A trisazo-dyestuff free from sulfonic acid groups and corresponding to the formula

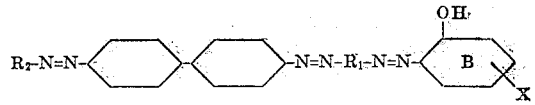

wherein $R_1$ represents the radical of an aromatic metadihydroxy compound to which the hydroxyl groups are bound in positions vicinal to the azo groups and which contains at most two fused six-membered rings, $R_2$ represents the radical of a 1-hydroxybenzene-2-carboxylic acid bound in the 4-position to the azo group, and X represents a member of the group consisting of a —CO-alkyl radical and a carboxylic acid arylide radical bound by its —CO-group to the benzene nucleus B which radical stands in para-position relatively to one of the other substituents of the benzene nucleus B.

2. A trisazo-dyestuff free from sulfonic acid groups and corresponding to the formula

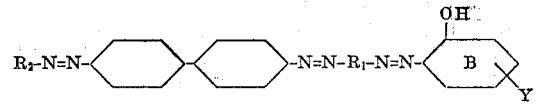

wherein $R_1$ represents the radical of an aromatic metadihydroxy compound to which the hydroxyl groups are bound in positions vicinal to the azo groups and which contains at most two fused six-membered rings, $R_2$ represents the radical of a 1-hydroxybenzene-2-carboxylic acid bound in the 4-position to the azo group, and Y represents a carboxylic acid arylide radical bound to the benzene nucleus B by its —CO-group and of which the nitrogen atom is substituted by an aromatic radical containing at most two fused six-membered rings, and Y stands in para-position relatively to one of the other substituents of the benzene nucleus B.

3. A trisazo-dyestuff free from sulfonic acid groups and corresponding to the formula

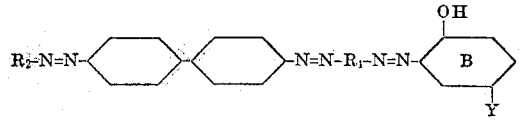

wherein R₁ represents the radical of an aromatic metahydroxy compound to which the hydroxyl

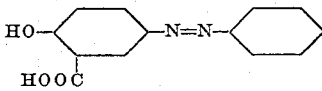

groups are bound in positions vicinal to the azo groups and which contains at most two fused six-membered rings, R₂ represents the radical of a 1-hydroxybenzene-2-carboxylic acid bound in the 4-position to the azo group and Y represents a carboxylic acid arylide radical which is bound to the benzene nucleus B by its —CO— group and of which the nitrogen atom is substi-

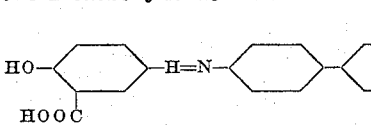

tuted by a benzene radical.

4. A trisazo-dyestuff free from sulfonic acid groups and corresponding to the formula

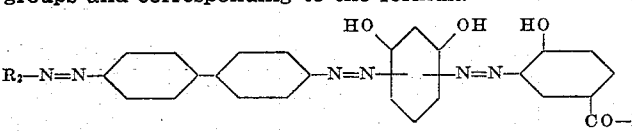

wherein R₂ represents the radical of a 1-hydroxybenzene-2- carboxylic acid bound in 4-position to the azo group, Z represents a benzene radical, and the radical of the 1:3-dihydroxybenzene is bound to the azo groups in ortho-positions relatively to the hydroxyl groups.

5. A trisazo-dyestuff free from sulfonic acid groups and corresponding to the formula

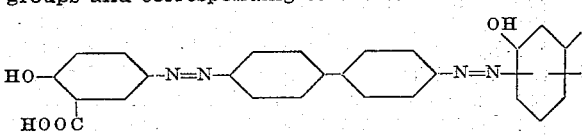

wherein Z represents a benzene radical, and the radical of the 1:3-dihydroxybenzene is bound to the azo groups in ortho-positions relatively to the hydroxyl groups.

6. A trisazo-dyestuff corresponding to the formula

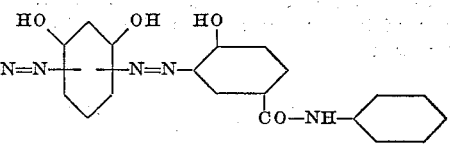

wherein the radical of the 1:3-dihydroxybenzene is bound to the azo groups in ortho positions relatively to the hydroxyl groups.

7. A trisazo-dyestuff corresponding to the formula

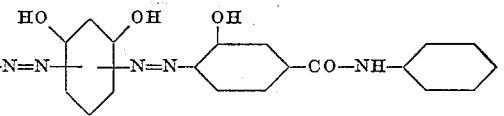

wherein the radical of the 1:3-dihydroxybenzene is bound to the azo groups in ortho positions relatively to the hydroxyl groups.

8. A trisazo-dyestuff corresponding to the formula

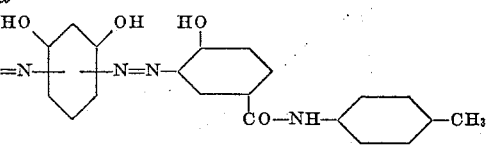

wherein the radical of the 1:3-dihydroxybenzene is bound to the azo groups in ortho positions relatively to the hydroxyl groups.

9. A trisazo-dyestuff corresponding to the formula

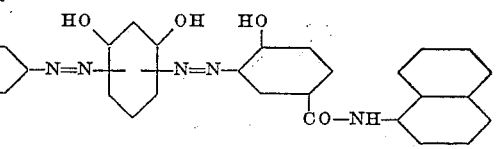

wherein the radical of the 1:3-dihydroxybenzene is bound to the azo groups in ortho positions relatively to the hydroxyl groups.

10. A trisazo-dyestuff corresponding to the formula

wherein the radical of the 1:3-dihydroxybenzene is bound to the azo groups in ortho positions relatively to the hydroxyl groups.

KARL MENZI.

REFERENCES CITED

The following references are of record in the file of this patent:

UNITED STATES PATENTS

| Number | Name | Date |
|---|---|---|
| 399,581 | Strasburger | Mar. 12, 1889 |
| 2,282,331 | Krebser | May 12, 1942 |